Figure 1:
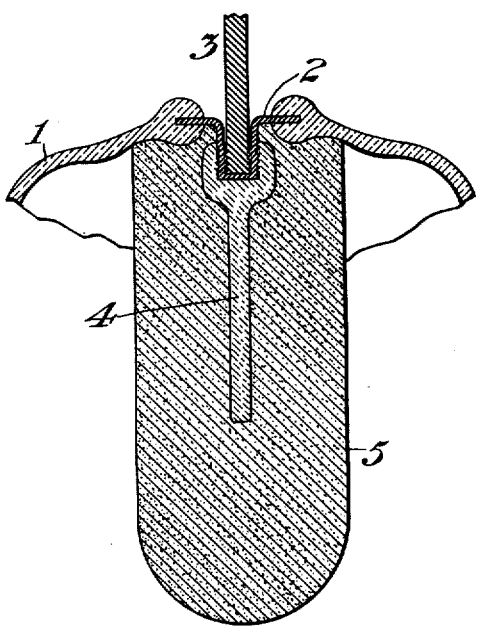

P. H. THOMAS.
ELECTRODE FOR VAPOR ELECTRIC APPARATUS.
APPLICATION FILED FEB. 10, 1904.

946,079.  Patented Jan. 11, 1910.

UNITED STATES PATENT OFFICE.

PERCY H. THOMAS, OF EAST ORANGE, NEW JERSEY, ASSIGNOR TO COOPER HEWITT ELECTRIC COMPANY, OF NEW YORK, N. Y., A CORPORATION OF NEW YORK.

ELECTRODE FOR VAPOR ELECTRIC APPARATUS.

946,079.   Specification of Letters Patent.   Patented Jan. 11, 1910.

Application filed February 10, 1904. Serial No. 192,925.

*To all whom it may concern:*

Be it known that I, PERCY H. THOMAS, a citizen of the United States, and resident of East Orange, county of Essex, State of New Jersey, have invented certain new and useful Improvements in Electrodes for Vapor Electric Apparatus, of which the following is a specification.

When solid electrodes are used in gas or vapor electric apparatus designed for lighting, current rectifying, or other purposes, difficulty is sometimes experienced, first, in securing good electrical connection with the lead-wires and in properly protecting the seals of such lead-wires; second, in securing electrodes of proper form for easy insertion into the operating chamber without affecting injuriously the subsequent-closing of the opening in the container (which is usually of glass); and, third, in providing an electrode of such material as will not exert any injurious effect upon the life or operation of the apparatus. Even when the common method is employed of mounting a solid electrode upon a platinum wire or disk sealed into the glass container, it is sometimes found that the platinum which is in contact with the vapor exercises such an injurious effect. Although in some cases platinum is found to be well suited to the purposes of apparatus of this class, yet there are substances known which under certain conditions have a less harmful effect.

It is one of the objects of the present invention to provide an electrode which will offer no injurious effect to the action of the apparatus while in operation, and will not shorten its effective life.

Another object is to provide an electrode of suitable form, and still another object is to secure good electrical connection with the leading-in conductors, while properly protecting the seal.

For accomplishing the result named I may make use of a material such as graphite in a finely divided state, and having made it into a paste by means of a suitable cement or binder, such as shellac, I may form an electrode completely inclosing the platinum or other leading-in wire and may fasten the paste securely to the inner wall of the containing chamber, the leading-in wire being completely surrounded by the paste inside the container. Such an arrangement makes it possible to expose to the action of the vapor nothing but the selected material combined with the mixture of inert cement or binder. The mode of connection described plainly admits of forming the solid electrode into any preferred shape, so that the necessity for making a very wide opening in the glass into which the lead-wires are sealed will not exist. The cement or binder will be first brought to a proper consistency and mixed with the powdered or finely divided selected material, and it may consist, as stated, of sugar, gum shellac, or any material suited to the purposes.

My invention is illustrated in the accompanying drawing in which—

Figure 2:
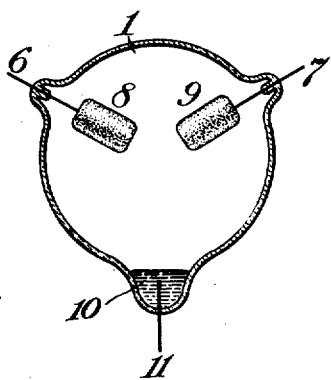
Figure 3:
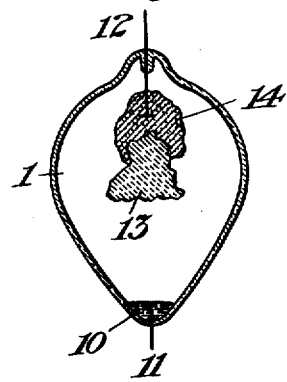

Figure 1 is a section of a portion of a gas or vapor electric apparatus having my improved solid electrode applied thereto; and Figs. 2 and 3 illustrate modifications.

In the drawings, 1 represents a container of glass or some material into which, in the construction illustrated in Fig. 1, a reëntrant disk 2 of platinum is sealed and connected by screw threads as shown or by any other suitable means. To the outside of the reëntrant portion of the disk 2 I may attach by screw threads, or otherwise, a bar, 4, of copper or other good conducting material. To the metallic structure thus described, I may apply the solid electrode, 5, in the form of a paste made of, say, finely divided graphite mixed with a binder of gum shellac of the proper consistency. This paste may be caused to adhere to the bar 4, the reëntrant disk 2 and a portion of the walls of the container 1 in such a manner that the only part of the electrode within the container which is exposed to the vapors therein is the above described mixture. In other words, the platinum and the copper are wholly protected from the effects of the vapors and consequently are prevented from exerting an injurious effect thereupon while the material selected for the exposed portion of the electrode is of such a character as not to affect injuriously either the life or operation of the apparatus.

The bar 4, may, if preferred, be omitted, its function being mainly that of giving additional strength to the completed electrode and making good electrical connection for the electrode by bringing a considerable portion of its surface into contact with a better conducting material than itself. The paste having been put in place may be baked and hardened by any suitable means.

In Fig. 2, a complete current rectifier is shown having a container, 1, of glass, lead-wires, 6 and 7, generally of platinum, solid electrodes, 8 and 9, of the same general character as that above described, a negative electrode, 10, of mercury, and a lead-wire, 11, joined to the said negative electrode. In this case, I show the electrodes 8 and 9 as being mounted upon the lead-wires, 6 and 7, respectively, and as covering and protecting the major portion of the said lead-wires.

Fig. 3 shows a current rectifier having a mercury electrode, 10, connected to a lead-wire, 11, a container, 1, of glass, and a single positive electrode supported upon a lead-wire, 12. In this instance the paste is utilized for supporting better than could otherwise be done an electrode of silicon appearing at 13. The paste is shown at 14 as covering and protecting a portion of the lead-wire 12.

It usually happens that silicon is produced in rough or jagged pieces which do not readily adapt themselves to being connected with a lead-wire except by the use of a conducting paste such as is herein disclosed. When, however, such a paste is used, advantage may be taken of its qualities for making good connection between the lead-wire and the silicon and also for so setting the irregular piece of silicon as to make its admission into the chamber of the apparatus as convenient as possible.

I claim as my invention:—

1. In a gas or vapor electric apparatus, an electrode and a container therefor, leading-in devices connected with the said electrode, the latter consisting of a conducting hardened paste, a portion of which adheres to the walls of the container and surrounds the leading-in devices.

2. In a gas or vapor electric apparatus, an electrode and a container therefor, leading-in devices connected with the said electrode, the latter consisting of a conducting hardened paste, entirely surrounding the leading-in devices, and a portion of the electrode adhering to the walls of the container.

Signed at New York, in the county of New York, and State of New York, this 6th day of February, A. D. 1904.

PERCY H. THOMAS.

Witnesses:
WM. H. CAPEL,
GEORGE H. STOCKBRIDGE.